United States Patent
Otosaka (10) Patent No.: US 9,371,246 B2
(45) Date of Patent: Jun. 21, 2016

(54) GLASS BASE MATERIAL ELONGATING METHOD AND GLASS BASE MATERIAL ELONGATING APPARATUS

(71) Applicant: Shin-Etsu Chemical Co., Ltd., Tokyo (JP)

(72) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 211 days.

(21) Appl. No.: 13/869,987

(22) Filed: Apr. 25, 2013

(65) Prior Publication Data
US 2013/0291601 A1 Nov. 7, 2013

(30) Foreign Application Priority Data
May 2, 2012 (JP) .................................. 2012-105127

(51) Int. Cl.
| | |
|---|---|
| *C03B 37/025* | (2006.01) |
| *C03B 37/03* | (2006.01) |
| *C03B 37/012* | (2006.01) |
| *C03B 23/045* | (2006.01) |
| *C03B 23/047* | (2006.01) |

(52) U.S. Cl.
CPC ............. *C03B 37/032* (2013.01); *C03B 23/045* (2013.01); *C03B 23/047* (2013.01); *C03B 37/0124* (2013.01); *C03B 37/0126* (2013.01); *C03B 37/0253* (2013.01)

(58) Field of Classification Search
CPC ...................... C03B 37/0124; C03B 37/01242; C03B 37/0126
See application file for complete search history.

(56) References Cited

U.S. PATENT DOCUMENTS

| | | | |
|---|---|---|---|
| 6,279,353 B1 | 8/2001 | Wada et al. | |
| 6,386,001 B1* | 5/2002 | Shimizu et al. | ................. 65/377 |
| 6,938,442 B1* | 9/2005 | Schmitt et al. | .................. 65/381 |
| 2001/0009104 A1* | 7/2001 | Wada et al. | ...................... 65/407 |
| 2005/0076675 A1* | 4/2005 | Bogdahn | ................ C03B 17/04 |
| | | | 65/29.12 |
| 2007/0119214 A1* | 5/2007 | Bogdahn et al. | ................ 65/378 |
| 2007/0169515 A1 | 7/2007 | Tobisaka | |
| 2012/0222452 A1 | 9/2012 | Otosaka | |

FOREIGN PATENT DOCUMENTS

| | | |
|---|---|---|
| AU | 504284 B2 | 10/1979 |
| CN | 1199026 A | 11/1998 |
| CN | 1347393 A | 5/2002 |

(Continued)

OTHER PUBLICATIONS

Machine Translation CN102627399 performed Mar. 18, 2015 with ProQuest Dialog.*
English Translation CN102627399A, Performed by USPTO Translation Service Center, Apr. 2015.*
Notice of Office Action for Japanese Patent Application no. 2012-105127, issued by the Japanese Patent Office on Sep. 10, 2014.

(Continued)

*Primary Examiner* — Lisa Herring (57) ABSTRACT

A glass base material elongating method of sequentially feeding rod-like glass base materials hung by a glass base material feeding mechanism into a heating furnace, and pulling a glass rod with a smaller diameter by a pulling chuck at a lower part of the heating furnace, includes: aligning, by an alignment guiding device that guides the glass rod, a guiding center of the alignment guiding device with an axis of the glass rod, the alignment guiding device guiding the glass rod between the heating furnace and the pulling chuck.

7 Claims, 12 Drawing Sheets

(56) References Cited

FOREIGN PATENT DOCUMENTS

| CN | 102627399 A | * | 8/2012 |
|----|-------------|---|--------|
| JP | H05-78139 A |   | 3/1993 |
| JP | H09-202636 A |  | 8/1997 |
| JP | 2004-051381 A | | 2/2004 |
| JP | 2005-225704 A | | 8/2005 |
| JP | 2011-140412 A | | 7/2011 |

OTHER PUBLICATIONS

European Search Report for European Patent Application No. 13166207.4, issued by the European Patent Office on Jul. 30, 2013.
Notice of Office Action for Chinese Patent Application No. 201310159520.2, issued by the State Intellectual Property Office of Peoples' Republic of China on Feb. 28, 2015.

* cited by examiner

GLASS BASE MATERIAL ELONGATING METHOD AND GLASS BASE MATERIAL ELONGATING APPARATUS

CROSS REFERENCE TO RELATED APPLICATION

The contents of the following Japanese patent application(s) are incorporated herein by reference: NO. 2012-105127 filed on May 2, 2012.

BACKGROUND

1. Technical Field

The present invention relates to a glass base material elongating method and a glass base material elongating apparatus.

2. Related Art

An example of glass base materials is an optical fiber preform that is formed with a quartz glass rod. In one method of manufacturing a glass base material, a glass base material with a large diameter is manufactured in advance, and then the glass base material is heated and elongated to manufacture a glass rod with a smaller diameter than that of the glass base material. The glass base material with the large diameter is hung to be vertically long in an elongating furnace, and in this state, a pulling dummy attached to a lower part of the glass base material is pulled down to elongate the glass base material.

SUMMARY

At the step of elongation in an elongating furnace, a glass rod may be bent due to the weight of a glass base material, and this may degrade the yield or productivity.

A first aspect of the present invention provides a glass base material elongating method of sequentially feeding rod-like glass base materials hung by a glass base material feeding mechanism into a heating furnace, and pulling a glass rod with a smaller diameter by a pulling chuck at a lower part of the heating furnace, the method including: aligning, by an alignment guiding device that guides the glass rod, a guiding center of the alignment guiding device with an axis of the glass rod, the alignment guiding device aligning between the heating furnace and the pulling chuck.

A second aspect of the present invention provides a glass base material elongating apparatus that extends a rod-like glass base material, and manufactures a glass rod with a smaller diameter, the apparatus including: a heating furnace; a glass base material feeding mechanism; and a glass rod pulling chuck, wherein the glass base material elongating apparatus further comprises an alignment guiding device that aligns, between the pulling chuck and the heating furnace, a guiding center of the alignment guiding device with an axis of the glass rod.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

First Embodiment

Figure 1:
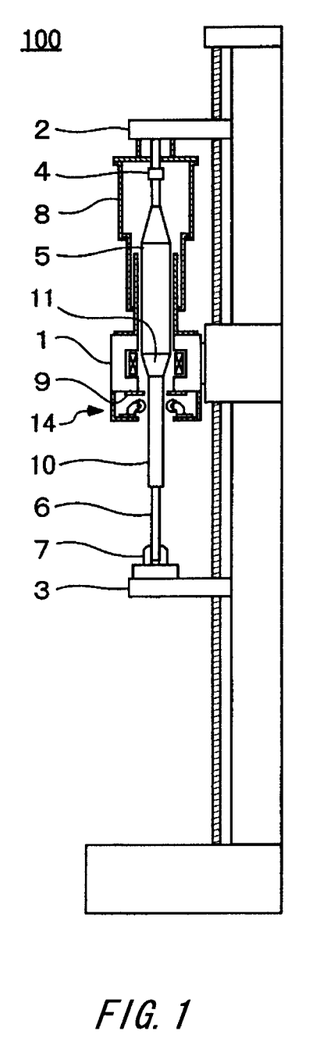
FIG. 1 is a schematic diagram showing a structure of an elongating apparatus 100.

FIG. 1 is a schematic diagram showing a structure of a glass base material elongating apparatus 100. The elongating apparatus 100 includes a feeding mechanism 2, a heating furnace 1, an alignment guiding device 14 and a pulling mechanism 3, all of which are provided in this order from above in the direction of the gravitational force.

A glass base material 5 is hung via a hanging connecting part 4 in the feeding mechanism 2. A lower part of the glass base material 5 is connected to the pulling mechanism 3 via a pulling dummy 6 and a pulling chuck 7. The pulling chuck 7 has a load meter that measures loads that are applied vertically upward and downward.

The heating furnace 1 has, for example, a carbon heater. For the purpose of preventing wear due to oxidation, inert gas such as nitrogen and argon is introduced into the heating furnace 1. Also, for the purpose of preventing the outside air from entering into the heating furnace 1, a top chamber 8 and a furnace exit gas seal 9 are provided.

The glass base materials 5 are sequentially fed into the heating furnace 1 by the feeding mechanism 2, and heated and softened by the heating furnace 1. A lower part of the glass base material 5 is pulled by the pulling mechanism 3, and thereby a glass rod 10 with a smaller diameter is formed. Accordingly, a lowering rate V2 of the pulling mechanism 3 is set to be faster than a lowering rate V1 of the feeding mechanism 2. The lowering rates V1, V2 are adjusted so that an outer diameter of the glass rod 10 is kept constant.

Furthermore, the alignment guiding device 14 is provided between the pulling chuck 7 and the heating furnace 1. The alignment guiding device 14 guides the glass rod 10 in a state that a guiding center of the alignment guiding device 14 is aligned with an axis of the elongated glass rod 10.

Figure 2:
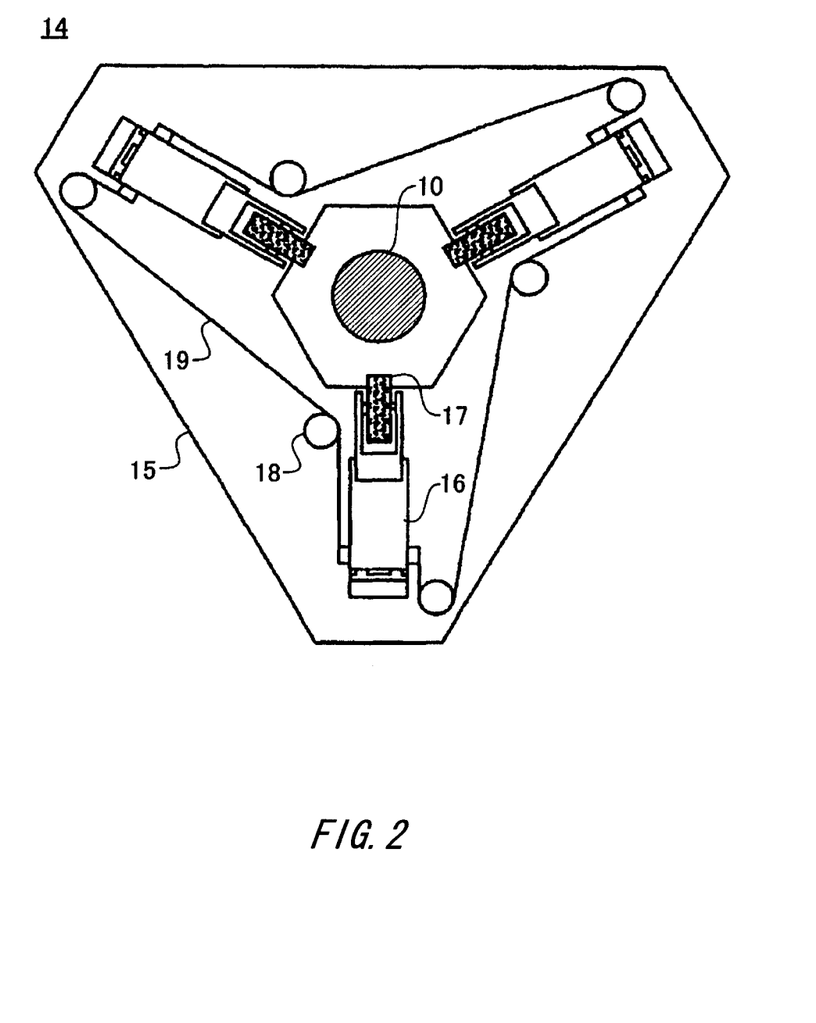
FIG. 2 is a schematic plan view of an alignment guiding device 14.

FIG. 2 is a schematic plan view showing only the alignment guiding device 14, and mainly shows an aligning mechanism of the alignment guiding device 14. Also, FIG. 2 shows a state that the alignment guiding device 14 is not guiding the glass rod 10.

The alignment guiding device 14 has a base plate 15 and a plurality of guiding rollers 17. The base plate 15 has a through-hole at a center thereof through which the glass rod 10 is inserted.

Each of the plurality of guiding rollers 17 is mounted individually on a slide table 16 that is driven by an air cylinder provided on the base plate 15. The guiding rollers 17 are formed, for example, with carbon.

The slide tables 16 are connected by three synchronized wires 19 via six guiding pulleys 18 attached to the base plates 15. Thereby, the three slide tables 16 are driven in synchronization with each other. Accordingly, regardless of the positions of the slide tables 16, the center of the three guiding rollers 17, i.e., the guiding center of the alignment guiding device 14, is kept at one position.

Figure 3:
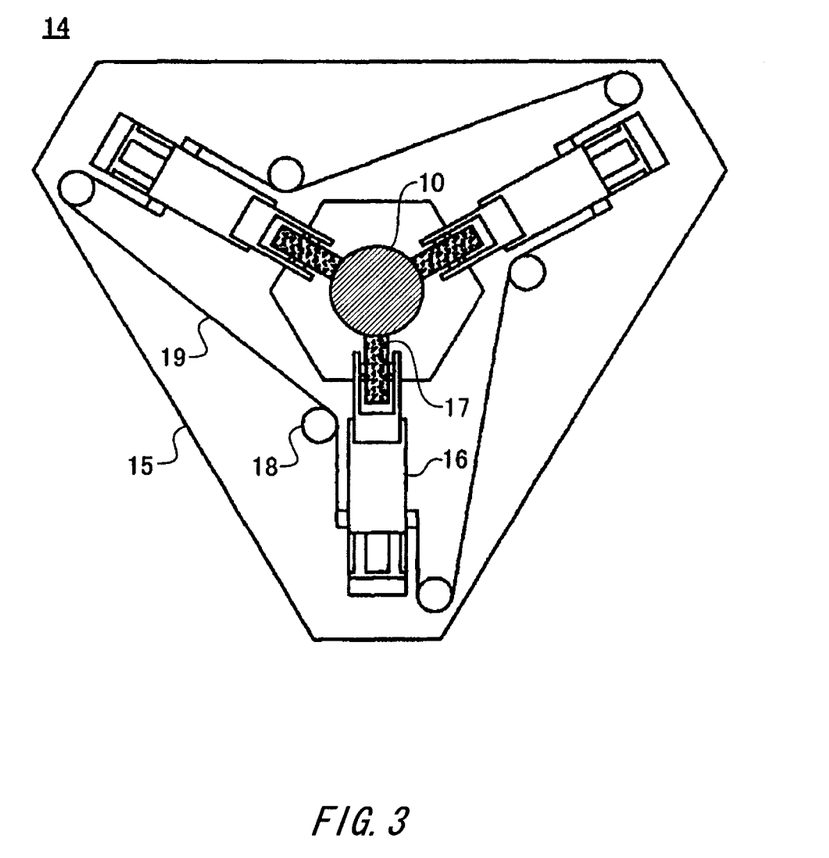
FIG. 3 is a schematic plan view of the alignment guiding device 14.

FIG. 3 is a schematic plan view of the alignment guiding device 14, and shows a state that the alignment guiding device 14 is guiding the glass rod 10. As described above already, the three slide tables 16 are driven synchronously, and the guiding center of the alignment guiding device 14 is always kept at one position. Accordingly, when all the three guiding rollers 17 abut on the glass rod 10, the axis of the glass rod 10 matches with the guiding center of the alignment guiding device 14.

Figure 4:
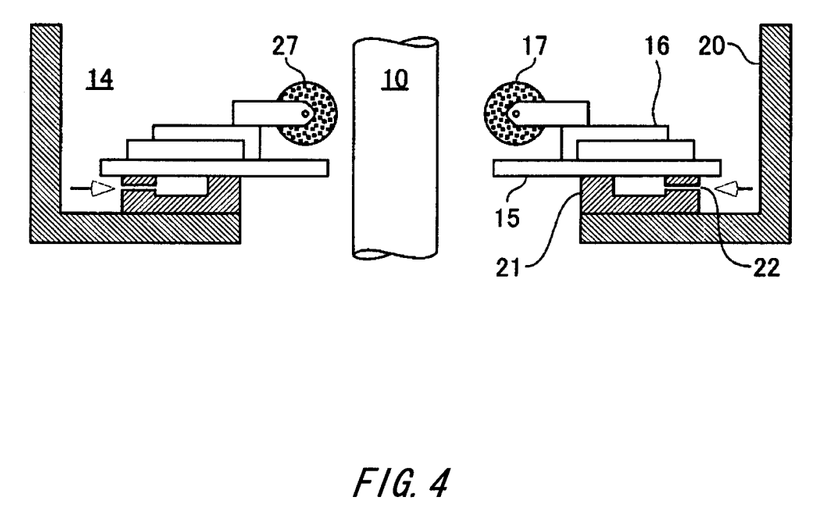
FIG. 4 is a schematic diagram of the alignment guiding device 14.

FIG. 4 is a schematic side view showing an initial state of operation of the alignment guiding device 14. For simplifying explanation, the alignment guiding device 14 is illustrated schematically in FIG. 4 by providing a pair of the guiding rollers 17 on the same plane.

The alignment guiding device 14 has a plurality of gas blow/suction blocks 21 supported by mounts 20. The plurality of gas blow/suction blocks 21 supports the base plates 15. Also, the gas blow/suction blocks 21 have gas outlet/inlet ports 22. When compressed gas is supplied to the gas outlet/inlet ports 22, the gas blow/suction blocks 21 blow gas from the upper surfaces in the figure to float the base plate 15. Thereby, the base plate 15 can slide in the horizontal direction easily and smoothly with a small force.

As described above already, the plurality of slide tables 16 and the plurality of guiding rollers 17 are provided on the base plates 15, and these collectively form an aligning mechanism. In the aligning mechanism, the plurality of guiding rollers 17 are driven in synchronization with each other.

Figure 5:
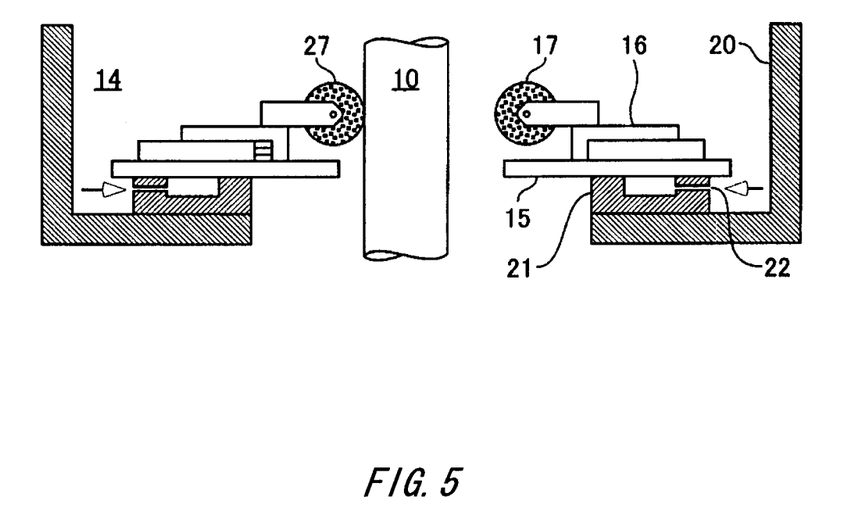
FIG. 5 is a schematic diagram of the alignment guiding device 14.

FIG. 5 shows the following state in the operation of the alignment guiding device 14. When the slide tables 16 are driven synchronously in a state that the base plates 15 are floated as stated above, any one of the guiding roller 27 first abuts on the glass rod 10. Furthermore, by continuing driving the slide tables 16 synchronously, the base plates 15 slide and move on the gas blow/suction blocks 21.

Figure 6:
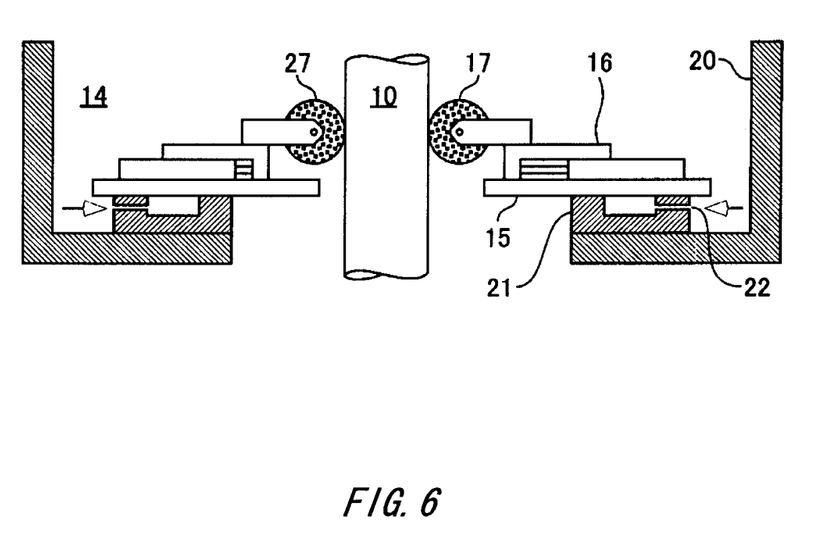
FIG. 6 is a schematic diagram of the alignment guiding device 14.

FIG. 6 shows the following state in the operation of the alignment guiding device 14. By further continuing driving the slide tables 16 as stated above, all the guiding rollers 17, 27 eventually abut on the glass rod 10, and the slide tables 16 and the base plates 15 stop.

When the base plate 15 is floating over the gas blow/suction block 21, the position of the glass rod 10 changes little in the above-described operation because the force of the guiding roller 27 that presses the glass rod 10 is very small. Accordingly, the guiding center of the alignment guiding device 14 is aligned toward the axis of the guiding rod 10 in the course of reaching the state shown in FIG. 6.

Figure 7:
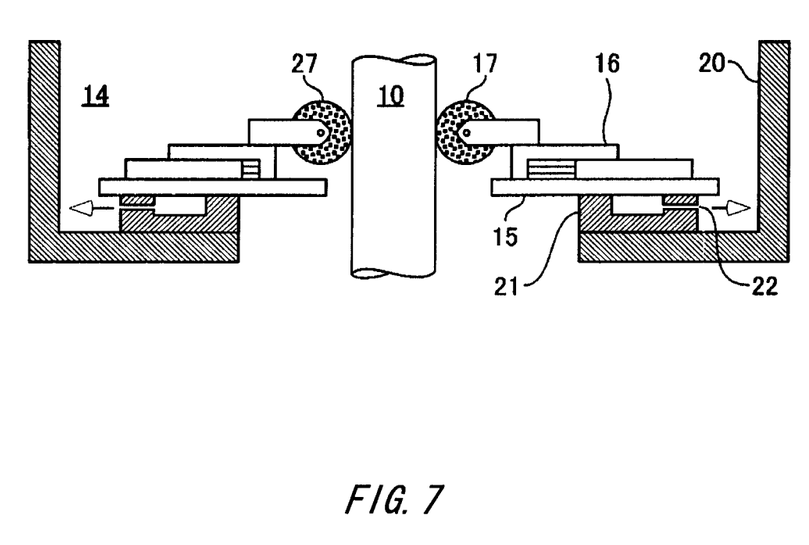
FIG. 7 is a schematic diagram of the alignment guiding device 14.

FIG. 7 shows the following state in the operation of the alignment guiding device 14. When the alignment guiding device 14 is aligned as described above, gas is discharged from the gas outlet/inlet port 22, and the gas blow/suction block 21 is evacuated to be in a vacuum state. Thereby, the gas blow/suction block 21 vacuum-suctions the base plate 15, and fixes the horizontal position of the base plate 15. Thereby, the state that the alignment guiding device 14 is aligned with the axis of the glass rod 10 is maintained.

In this manner, the alignment guiding device 14 can align with the glass rod 10 without changing the position of the glass rod 10 by closing the guiding rollers 17 toward the axis of the glass rod 10 in the aligning mechanism. Also, the alignment guiding device 14 can be kept aligned by the fixing mechanism.

Figure 8:
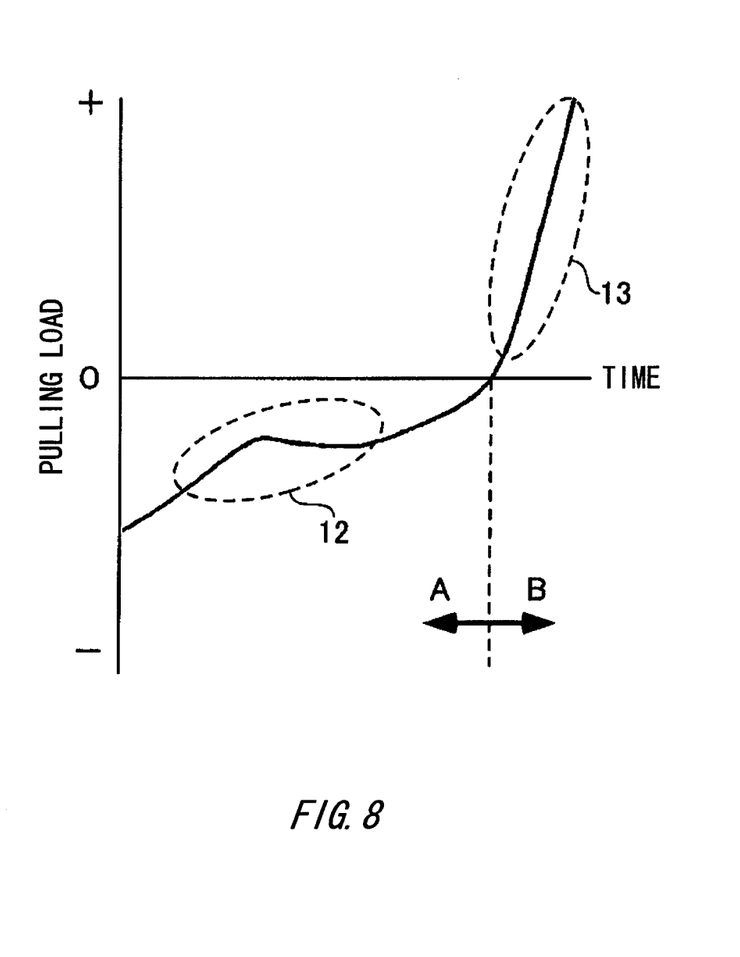
FIG. 8 is a graph that illustrates changes in loads that are applied to a pulling mechanism 3.

FIG. 8 is a graph that illustrates changes over time in loads that are applied vertically to the pulling mechanism 3 in the elongating apparatus 100. In FIG. 8, the positive side of the vertical axis shows a force that is applied vertically downward, and the negative side shows a force that is applied vertically upward.

When the temperature of the heating furnace 1 in the elongating apparatus 100 is relatively high, the viscosity of a neck-down 11 of the glass base material 5 becomes lower, and the weight of the glass rod 10 is applied vertically downward to the pulling mechanism 3. Thereby, a downward force is applied to the pulling mechanism 3.

On the contrary, when the temperature of the heating furnace 1 in the elongating apparatus 100 is relatively low, the viscosity of the neck-down 11 is high; as a result, a large force is required to deform the glass base material 5 and pull the glass rod 10. Accordingly, a vertically upward force, i.e. a force to pull up the pulling mechanism 3, is applied to the pulling mechanism 3.

Furthermore, as the elongation proceeds and the weight of the glass rod 10 increases, a force that is applied vertically downward to the pulling mechanism 3 becomes gradually larger even when the temperature of the heating furnace does not change. In addition, when the outer diameter of the glass base material 5 fluctuates, the force that is applied to the pulling mechanism 3 fluctuates also.

In the illustrated curve, although a waveform 12 is observed due to a diametrical fluctuation of the glass base material 5 in a period 12 in the beginning of elongation, the load shows an overall increase. Accordingly, the load indicated by the curve shifts from the negative side to the positive side. It can be estimated based on this that in the beginning of elongation, the pulling mechanism 3 pulls down, elongates and deforms the glass rod 10, but, in the last half of elongation, the pulling mechanism 3 receives a fall of the glass rod 10 due to its weight to control the rate of the fall.

Furthermore, in a period 13 immediately before the end of elongation, a noticeable increase of the load applied to the pulling mechanism 3 is observed. It can be estimated that this phenomenon is caused due to heating and accordingly softening of a tapered portion that is positioned at an upper portion of the glass base material 5 and is thinner than a straight barrel portion.

In an area A, in the illustrated graph, where a load is applied upward to the pulling mechanism 3, bending of the glass rod 10 is unlikely to occur because a tensile force is applied to the glass rod 10. On the other hand, in an area B where a load is applied downward to the pulling mechanism 3, a force that may cause the glass rod 10 to fall down about the pulling chuck 7 may be applied to the glass rod 10 because the pulling mechanism 3 is supporting the glass rod 10 to prevent it from falling down due to its weight.

When a force that may cause the glass rod 10 to fall down is applied to the glass rod 10, bending of the glass rod 10 may be generated due to axial deviation between the axis of the glass rod 10 and the axis of the glass base material 5 at the neck-down 11. When bending has occurred to the glass rod 10, the bent portion of the glass rod 10 has to be discarded or repaired, and this leads to degradation of the manufacturing cost and yield of the glass rod 10.

In the elongating apparatus 100, changes in the loads that are applied to the pulling mechanism 3 can be detected by the load meter provided to the pulling chuck 7. In such operation, the alignment guiding device 14 is activated immediately before or immediately after a downward load starts to be applied to the pulling mechanism 3. Thereby, the guiding center of the alignment guiding device 14 can be aligned with the axis of the glass rod 10 by moving, and at the same time aligning, the guiding rollers 17 with the axis of the glass rod 10.

Also, the state that the alignment guiding device 14 is aligned is maintained by fixing the aligning position by fixing the guiding rollers 17 with the fixing mechanism. Accordingly, the alignment guiding device 14 guides the glass rod 10 while the guiding center is kept matching with the axis of the glass rod 10.

Thereby, deviation of the axis of the glass rod 10 from the axis of the glass base material 5 is suppressed, and bending of the glass rod 10 can be prevented from occurring. Accordingly, because elongation can be continued without the glass rod 10 falling down, the glass rod 10 with few bends can be manufactured stably.

The center position of the glass rod 10 differs for each glass base material 5 to be elongated. Accordingly, bending of the glass rod 10 can be prevented for each glass base material 5 by performing alignment by the alignment guiding device 14 for each glass base material 5 to be elongated.

Also, the three guiding rollers 17 are provided to the alignment guiding device 14 in the above-described elongating apparatus 100. However, the number of the guiding rollers 17 is of course not limited to three, but may be larger, and the glass rod 10 may be guided by using a part or all of the guiding rollers 17.

Example 2

Figure 10:
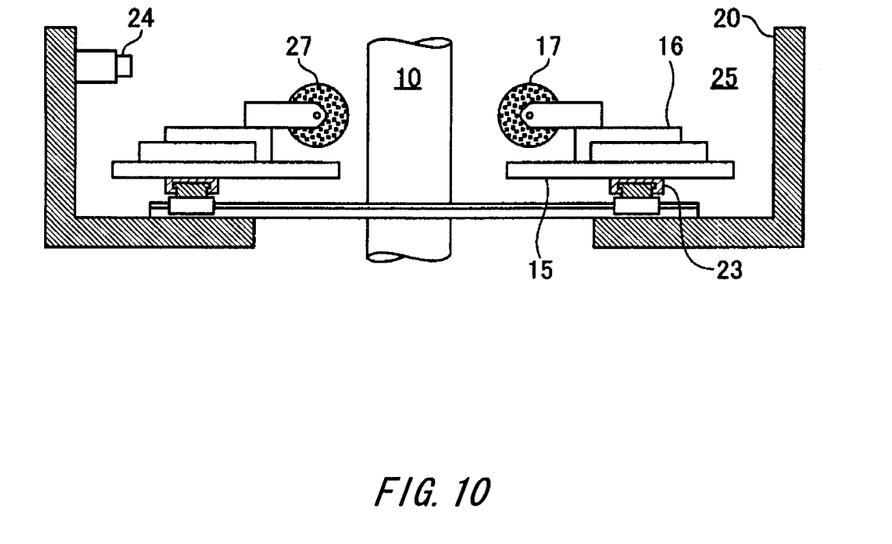
FIG. 10 is a schematic diagram of an alignment guiding device 25.

FIG. 10 shows an initial state of operation of another alignment guiding device 25. FIG. 10 is illustrated as seen from the same perspective as that of FIG. 4, the same elements as those in FIG. 4 are provided with the same reference numerals, and explanation is not repeated.

The alignment guiding device 25 is provided with a horizontal position adjusting mechanism 23 and a rod position identifying device 24. The horizontal position adjusting mechanism 23 is mounted on a mount 20. A base plate 15 is mounted on the horizontal position adjusting mechanism 23. A slide table 16 and a carbon guiding roller 17 are attached on the base plate 15. The horizontal position adjusting mechanism 23 may be, for example, an electrically-driven XY table.

The rod position identifying device 24 is fixed on the mount 20, and measures the horizontal position of a glass rod 10. That is, the rod position identifying device 24 consists of two pair of devices that can measure the horizontal position of the glass rod 10, one pair being dedicated to measure the position in the X direction, and the other pair being dedicated to measure the position in the orthogonally-crossing Y direction. Each of the rod position identifying device 24 may be any one of a combination of a camera and an image processing device, a laser diameter measurement instrument and a laser ranging instrument.

In the state shown in FIG. 10, all of the guiding rollers 17 are separated from the glass rod 10, and the glass rod 10 is not guided by the alignment guiding device 25. In this state, the rod position identifying device 24 measures the position of the glass rod 10.

Figure 11:
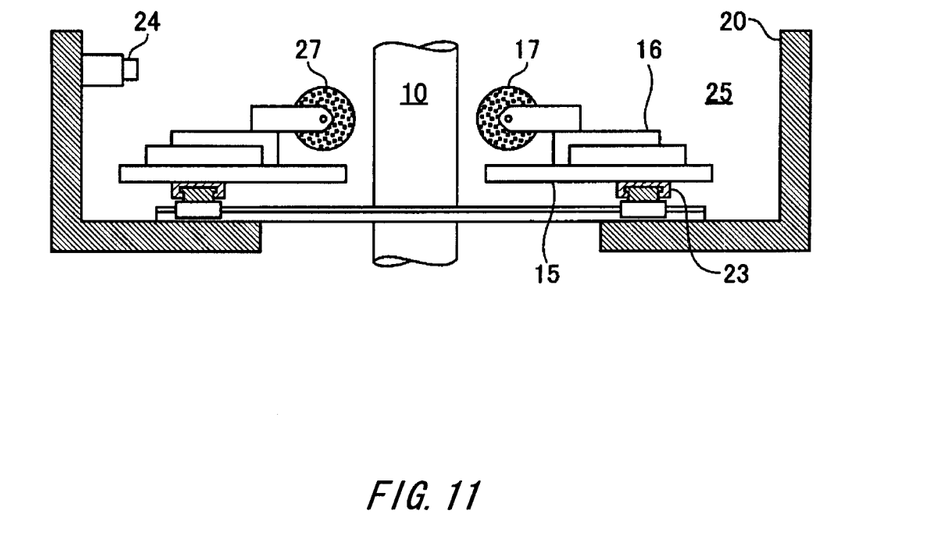
FIG. 11 is a schematic diagram of an alignment guiding device 25.

FIG. 11 shows the following state in the operation of the alignment guiding device 25. The horizontal position adjusting mechanism 23 moves the base plate 15 based on the positional information of the glass rod 10 identified by the rod position identifying device 24, and matches the center of the plurality of guiding rollers 17 with the axis of the glass rod 10. In this step, the horizontal position adjusting mechanism 23 fixes the position of the base plate 15.

Figure 12:
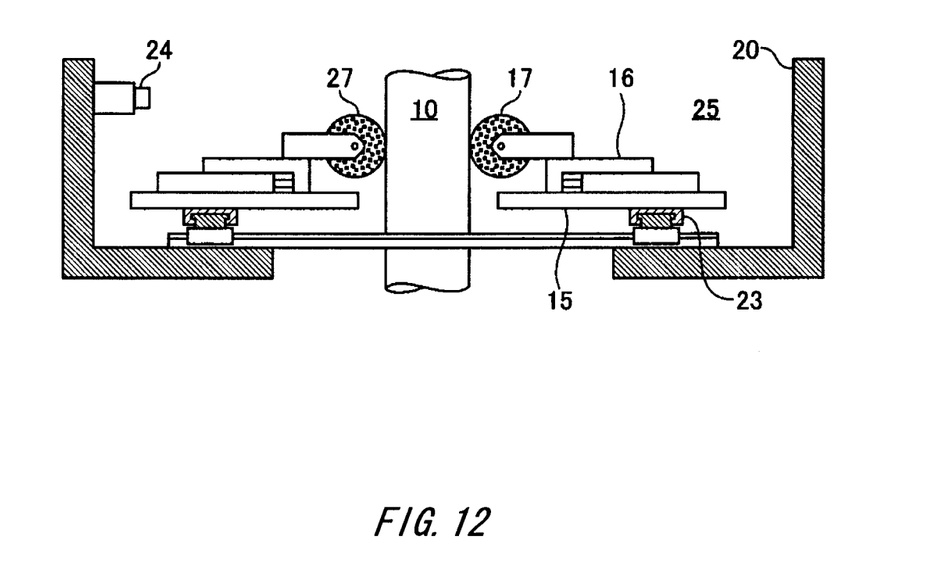
FIG. 12 is a schematic diagram of an alignment guiding device 25.

FIG. 12 shows the following state in the operation of the alignment guiding device 25. The slide tables 16 move synchronously in the alignment guiding device 25, and each of the guiding rollers 17 abuts on the glass rod 10. Thereby, the alignment guiding device 25 guides the glass rod 10 while the axis of the glass rod 10 is kept matching with the guiding center of the alignment guiding device 14.

In this manner, the guiding center of the alignment guiding device 25 having a different structure can also be matched with the axis of the glass rod 10. Thereby, deviation of the axis of the glass rod 10 from the axis of the glass base material 5 is suppressed, and bending of the glass rod 10 can be prevented from occurring.

Experiment Example 1

A glass base material 5 with the length of a straight barrel part of approximately 2000 mm and the outer diameter of approximately 180 mm was elongated to form a glass rod 10 with the length of approximately 2530 mm and the outer diameter of 160 mm, by using the elongating apparatus 100 provided with the alignment guiding device 14. When a downward load started to be applied to the pulling mechanism in the last half of elongation, the slide tables 16 were operated synchronously, the guiding center of the alignment guiding device 14 was aligned with the axis of the glass rod 10, and the aligning mechanism was fixed at this position.

Figure 9:
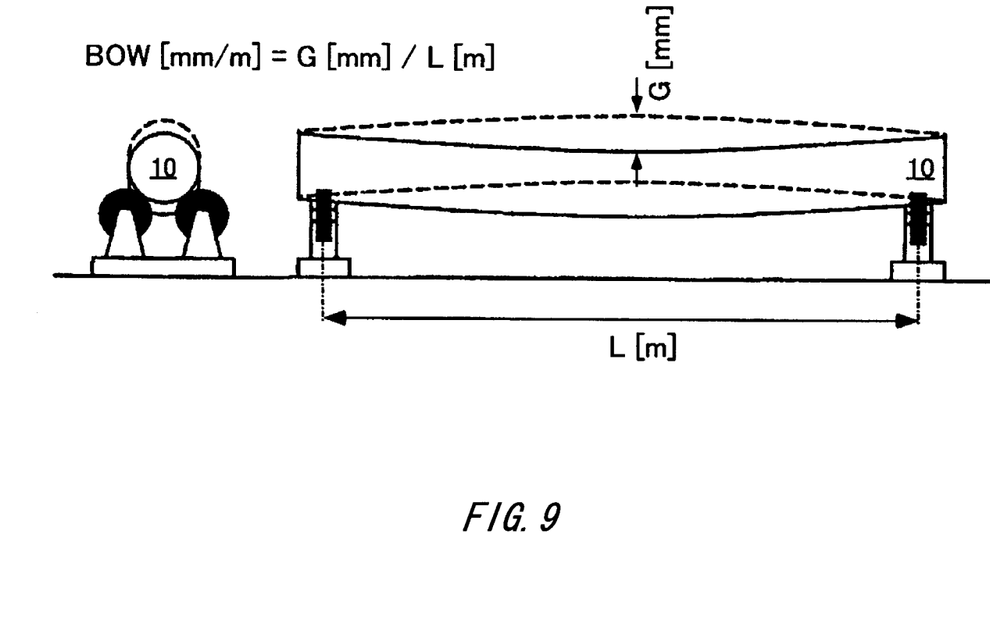
FIG. 9 is a diagram for explaining the degree of bending (BOW values) of a glass rod 10.

The degree of bending (BOW values) of the twenty thus-elongated glass rods 10 was measured, and the result showed the average value of 0.55 mm/m, and the maximum value of 1.02 mm/m. FIG. 9 shows a BOW value measurement method that was used. BOW values are obtained by dividing maximum widths G [mm] of whirling that occurred when the glass rods were supported and rotated by rollers that were positioned 50 mm away from both the ends of the glass rods, by the interval L [mm] between the rollers.

Experiment Example 2

A glass base material 5 with the length of a straight barrel part of approximately 2000 mm and the outer diameter of approximately 180 mm was elongated to form a glass rod 10 with the length of approximately 2530 mm and the outer diameter of 160 mm, by using the elongating apparatus 100 provided with the alignment guiding device 25. When a downward load started to be applied to the pulling mechanism in the last half of elongation, the slide tables 16 were operated synchronously, the guiding center of the alignment guiding device 14 was aligned with the axis of the glass rod 10, and the aligning mechanism was fixed at this position. The degree of bending (BOW values) of the twenty thus-elongated glass rods 10 was measured, and the result showed the average value of 0.59 mm/m, and the maximum value of 0.98 mm/m.

Comparative Example 1

A glass base material 5 was elongated by using the elongating apparatus 100 provided with the alignment guiding device 14, but without guiding by the alignment guiding device 14. The glass base material 5 with the length of a straight barrel part of approximately 2000 mm and the outer diameter of approximately 180 mm was elongated to form a glass rod 10 with the length of approximately 2530 mm and the outer diameter of 160 mm. Elongation was continued without activating the alignment guiding device 14 even when a downward load started to be applied to the pulling mechanism in the last half of elongation. The degree of bending (BOW values) of the twenty thus-elongated glass rods 10 was measured, and the result showed the average value of 1.58 mm/m, and the maximum value of 3.26 mm/m; thus, the degree of bending that was higher than those in Experiment Examples 1 and 2 was observed.

As can be seen, the elongating apparatus 100 elongates the glass rod 10 while guiding the glass rod 10 by using the alignment guiding device 14. Thereby, the glass rods 10 with few bends can be manufactured stably.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A glass base material elongating method comprising:
   feeding a glass base material hung by a glass base material feeding mechanism into a heating furnace;
   pulling a glass rod by a pulling chuck at a lower part of the heating furnace, the pulling of the glass rod establishing an axis of the glass rod; and
   shifting a guiding center of an alignment guiding device such that the guiding center conforms to the established axis of the glass rod, the alignment guiding device guiding the glass rod between the heating furnace and the pulling chuck.

2. The glass base material elongating method according to claim 1, wherein the shifting includes:
   aligning the guiding center with the axis of the glass rod; and
   fixing a position of the aligned guiding center.

3. The glass base material elongating method according to claim 2, wherein
   the alignment guiding device has a plurality of guiding rollers that are configured to freely abut on and be spaced apart from the glass rod, and
   the aligning includes moving the plurality of guiding rollers synchronously.

4. The glass base material elongating method according to claim 3, wherein the fixing includes sucking and fixing the plurality of guiding rollers by a gas blow/suction block that floats the plurality of guiding rollers when the plurality of guiding rollers are to be moved.

5. The glass base material elongating method according to claim 2, wherein the alignment guiding device is allowed to perform the aligning the guiding center when a downward force is applied to the pulling chuck.

6. The glass base material elongating method according to claim 1, wherein the shifting includes:
   measuring a horizontal position of the glass rod; and
   aligning the guiding center with the axis of the glass rod based on the horizontal position of the glass rod measured in the measuring.

7. A method comprising:
   shifting a guiding center of an alignment guiding device such that the guiding center conforms to an axis of a glass rod pulled from a glass base material fed into a heating furnace by a glass base material feeding mechanism, the alignment guiding device guiding the glass rod between the heating furnace and a pulling chuck that is disposed on the opposite side of the furnace from the glass base material feeding mechanism and pulls the glass rod so as to establish the axis of the glass rod to which the guiding center conforms.

* * * * *